J. R. FREEMAN.
MOLDED STRAINER OR SCREEN FOR WELLS, FILTERS, AND THE LIKE.
APPLICATION FILED JUNE 29, 1908.
907,328.
Patented Dec. 22, 1908.
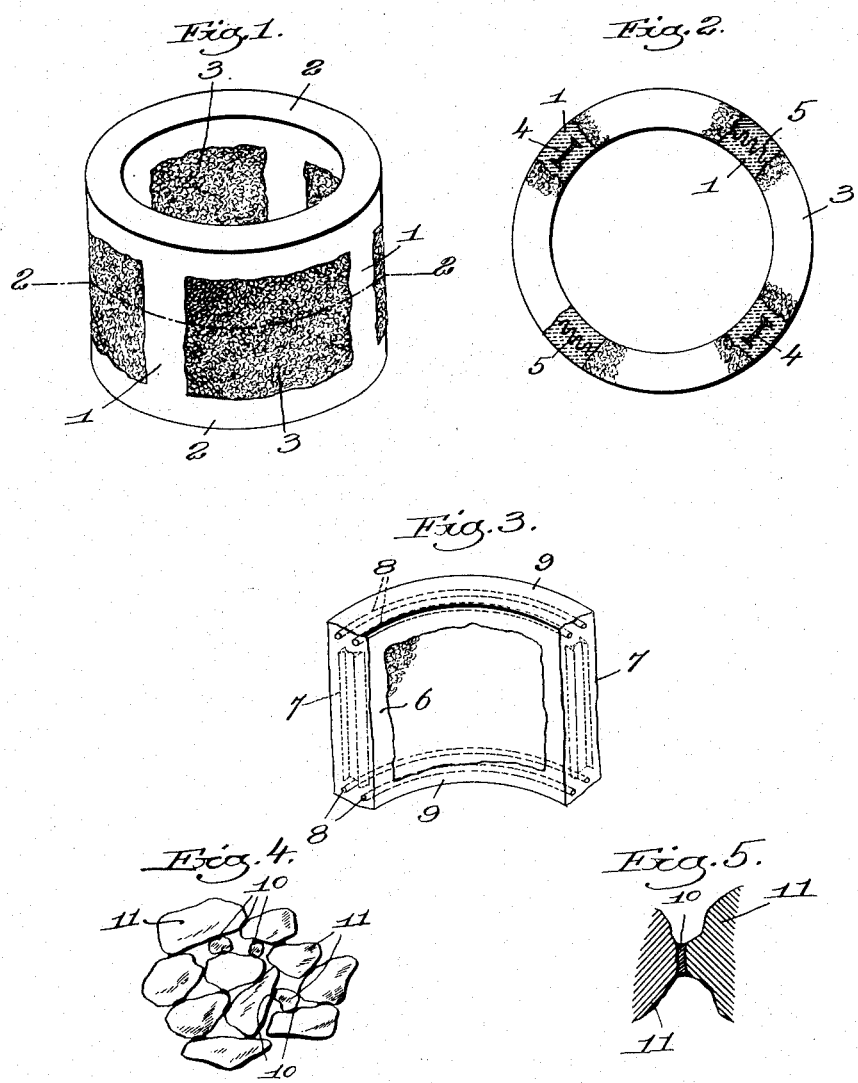

UNITED STATES PATENT OFFICE.

JOHN R. FREEMAN, OF PROVIDENCE, RHODE ISLAND.

MOLDED STRAINER OR SCREEN FOR WELLS, FILTERS, AND THE LIKE.

No. 907,328.

Specification of Letters Patent.

Patented Dec. 22, 1908.

Application filed June 29, 1906. Serial No. 440,797.

*To all whom it may concern:*

Be it known that I, JOHN R. FREEMAN, a citizen of the United States, and resident of Providence, county of Providence, State of Rhode Island, have invented an Improvement in Molded Strainers or Screens for Wells, Filters, and the Like, of which the following description, in connection with the accompanying drawing, is a specification, like letters on the drawing representing like parts.

This invention has for its object the production of a novel and efficient strainer or screen which may serve as a lining or casing for wells, filters and the like, and particularly adapted for use in lining wells for deriving water from saturated gravel or other earth, or as a base course for filtering material.

As will appear hereinafter the construction of the strainer or screen is such that a large proportion thereof presents pore-space for filtration purposes.

The strainer or screen may be made in cylindrical or in slab form, according to circumstances, and is composed of a maximum granular body, such as gravel of assorted sizes, made to adhere by mixture with a minimum binder, such as Portland cement or other suitable cementitious material. The proportion of the binder is such that it is just sufficient to hold the contacting particles of the body closely together and give strength of adhesion to the mass, while leaving a very large proportion of pore-space through which the water filters.

The properly mixed body and binder is molded while moist into the desired shape, and when hard is inserted in the well or other excavation to be lined. In some instances I find it desirable to strengthen the strainer or screen by ribs or portions of substantially pure cement or concrete, and these strengthening portions may be themselves reinforced by the introduction of metal or other framework of suitable shape and size. The cylinder or slab is thereby so strengthened as a whole that it may be more readily handled without breakage, or forced into place.

In using my strainer or screen as a lining for driven or other wells it will probably be most convenient to form it in cylindrical sections of suitable diameter and of convenient length, the sections being inserted into the well opening and superimposed one upon another.

The various novel features of my invention will be fully described in the subjoined specification and particularly pointed out in the following claims.

Figure 1 is a perspective view of a cylindrical section of molded strainer or screen embodying my invention, showing the use of strengthening portions; Fig. 2 is a cross-section on the line 2—2, Fig. 1, and I have shown metallic reinforcing means in the strengthening portions of the material; Fig. 3 is a perspective view of a curved slab of the molded strainer or screen, strengthened and reinforced; Fig. 4 is an enlarged detail showing the bond or contact formed by the binder between adjacent particles of the body; Fig. 5 is an enlarged sectional view of two particles of the body, illustrating the action of capillary attraction upon the binder while in fluid form.

In carrying out my invention I take for the body portion suitable granular material, such as gravel, using such sizes as may be best suited to the particular case, say from ¼ inch to ½ inch, and the sizes may and preferably will be mixed together, and with this body portion I use a binder of cementitious material, such as Portland cement. The binder is of a minimum proportion compared to the body, just enough being used to hold closely together the contacting portions of the particles of the body without filling the interstices, so that a large pore-space is presented. The properly moistened mixture of body and binder is then molded to the desired shape, which may be cylindrical, or curved or flat slabs, according to the requirements of the case. In some instances the molded strainer or screen so made will not require additional strengthening, but in other instances it may be advisable to provide strengthening means.

Referring to Fig. 1 I have shown a cylindrical section of the molded material embodying my invention, a skeleton comprising longitudinal portions 1 and circular end portions 2 being made of substantially pure concrete, the intervening spaces being filled with the maximum granular body and minimum binder, as indicated at 3. By so constructing the section it can be readily handled without danger of breakage and can be more easily introduced into position. Where greater strength is required, as when the sections are to be positioned with the exercise of some force or where used in form of slabs required to sustain a heavy weight, I find it desirable to reinforce the skeleton with metal. For instance, as shown in Fig. 2, I have illustrated I-bars 4 in two of the longitudinal strengthening ribs; and in the other two I have shown corrugated metal strips 5, the reinforce being preferably made of steel.

In the curved or segmental slab shown in Fig. 3 the longitudinal strengthening portions 6 are reinforced by I-bars, as 7, see dotted lines, and curved rods 8 may be used to reinforce the upper and lower concrete portions 9 of the slab.

From the foregoing description of my invention it will be manifest that the minimum of binder enables me to provide a maximum pore-space for the passage of the water through the strainer or screen, or for the support of still finer filtering material, insuring a very complete and efficient straining, while the material or porous slab as a whole serves to hold back the saturated gravel or other soil through which the water is derived.

In Fig. 4 I have illustrated the relatively large area of bond or contact to give strength of adhesion to the mass, the heavy or thickened lines at 10 indicating the small area of the cementitious binder at the point of contact between two of the particles 11 constituting the body.

The binder in practice is applied in the form of a very thin liquid grout of pure cement and water, and under the laws of capillary attraction it naturally collects at the points of contact while still in the fluid form, as illustrated on a large scale in Fig. 5, thereby giving adhesion, between contacting particles, over an area much larger than that of the mere contacting point of such particles.
As shown in Fig. 5 the capillary action tends to draw the binder while fluid into the crevice and away from such portions of the surfaces of the particles as are not in contact.

My invention is not restricted to any particular form for the lining sections, nor to any particular character of material for the body, nor to the size of the particles thereof, so long as the same, when united by the binder, will present a large pore-space. Nor is it restricted to a porous durable material to be used for the special purpose herein described for obviously if molded into suitable form this material will serve the purpose of a porous slab or tank for the diffusion of liquids in thin films while passing over a large superficial surface in contact with currents of air for purpose of inducing oxidation or other chemical or bacterial action.

Having fully described my invention, what I claim as new and desire to secure by Letters Patent is:—

1. A molded strainer or screen adapted for lining wells and the like, composed of a maximum granular body and a minimum cementitious binder therefor, and strengthening portions of binder material unmixed with the body material.

2. A molded strainer or screen for wells and the like, comprising a strengthening skeleton of substantially pure concrete, and a porous filling composed of a granular body and a minimum of cementitious binder therefor.

3. A molded strainer or screen for wells and the like, comprising a strengthening skeleton of substantially pure concrete, and reinforcing steel, and a porous filling composed of gravel and a minimum of cement to bind the same together while leaving a large pore-space.

4. A strainer or screen, composed of a body of gravel from ⅛ inch up to ½ inch and a sufficient proportion of cement to bind the particles of gravel closely together while leaving a large amount of pore-space between them for filtration, the body and binder being molded to shape.

5. A molded strainer or screen adapted to serve as a lining for wells and the like, composed of a body of gravel or small stone and sufficient cementitious binder to hold the particles of the body together and leave between them a large pore-space, and reinforcing ribs molded into the lining.

In testimony whereof, I have signed my name to this specification, in the presence of two subscribing witnesses.

JOHN R. FREEMAN.

Witnesses:
EDWIN D. PINGREE,
JOHN A. O'CONNELL.